2 Sheets--Sheet 2.

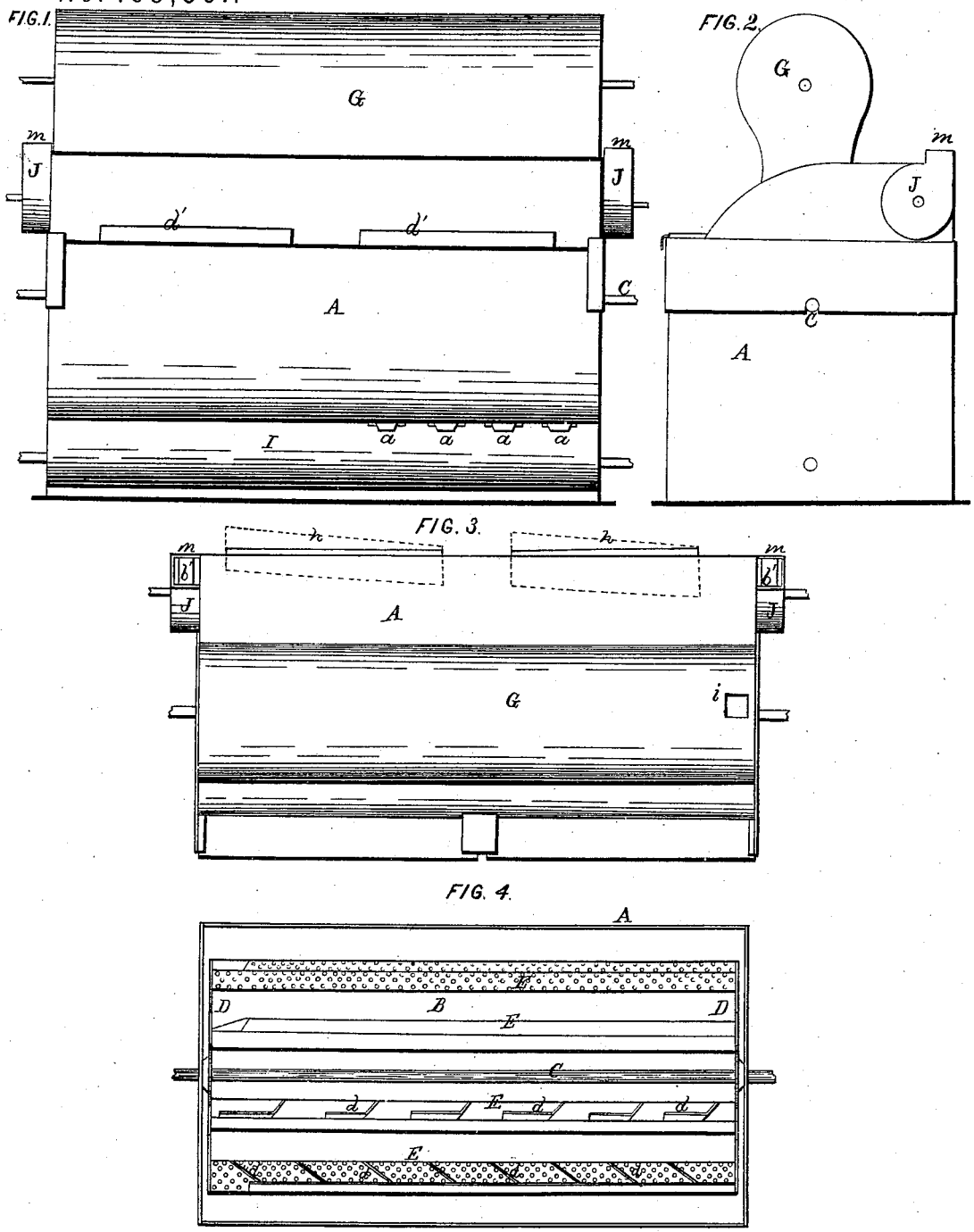

A. P. TEACHOUT.
Middlings-Purifier.

No. 169,061.  
Patented Oct. 19, 1875.

WITNESSES.  
H. F. Cornell.  
S. M. Odoms

INVENTOR.  
Albert P. Teachout.  
Ser. Burridge & Co.  
Attys.

UNITED STATES PATENT OFFICE.

ALBERT P. TEACHOUT, OF MADISON, ASSIGNOR OF ONE-HALF HIS RIGHT TO JOSEPH HAYWARD, OF CLEVELAND, OHIO.

IMPROVEMENT IN MIDDLINGS-PURIFIERS.

Specification forming part of Letters Patent No. 169,061, dated October 19, 1875; application filed July 22, 1875.

*To all whom it may concern:*

Be it known that I, ALBERT P. TEACHOUT, of Madison, in the county of Lake and State of Ohio, have invented a certain new and Improved Middlings-Purifier; and I do hereby declare that the following is a full, clear, and complete description thereof, reference being had to the accompanying drawings, making part of the same.

Figure 5:
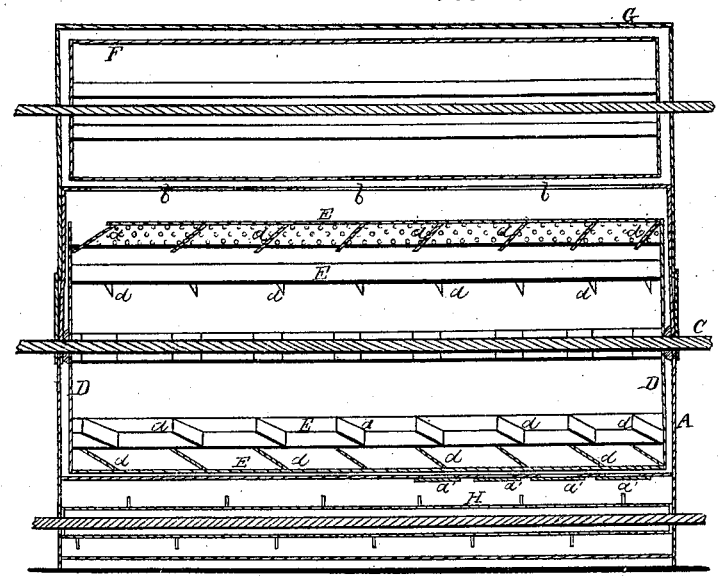
Figure 6:
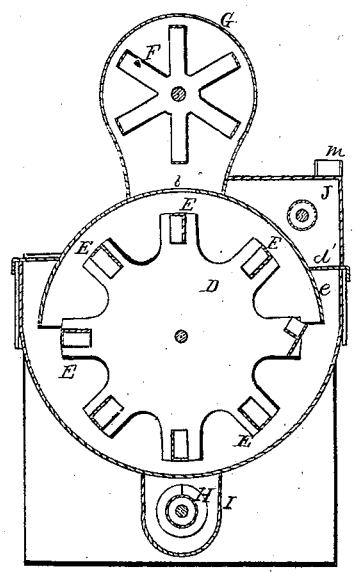

Figure 1 is a side view of the purifier. Fig. 2 is an end view. Fig. 3 is a top view. Fig. 4 is a top view of the inside. Fig. 5 is a longitudinal section. Fig. 6 is a transverse section.

Like letters of reference refer to like parts in the several views.

This invention is for purifying middlings by the use of a current of air caused to pass through the middlings while they are agitated and lifted in a revolving agitator, constructed and operated substantially in the manner as follows:

In the drawing, A represents a chest, in which is journaled the agitating-reel B, Fig. 4. Said agitating-reel consists of the shaft C, having its bearings in the ends of the chest, and centers D secured to the shaft, to which centers are fastened the bars E, having secured to them flights d. The particular shape of the flights is not a matter of importance. In Fig. 6 may be seen an end view of the agitating-reel, and in Fig. 5 is shown a sectional side view. Immediately above the agitating reel and chest, and longitudinally therewith, is arranged a bolting-reel, F, in the cylinder G, Fig. 5. Said bolting-reel is or may be constructed in the same manner as those now in use, and covered with different grades of bolting-cloth in the same way as bolting-reels are generally for bolting and grading middlings. The cylinder G communicates with the chest containing the agitating-reel by openings b, Figs. 5 and 6, made along the upper side of said chest. Directly below the chest of the agitator is a conveyer, H, in the cylinder or trough I, Figs. 5 and 6, which is also put in communication with the agitator-chest A by a series of openings in the bottom of the chest, provided each with a slide, a, Fig. 1, for closing said openings, for a purpose hereinafter shown.

At each of the two upper corners of the agitator-chest is a case, J, in which is a fan or blower, b', Fig. 3, which is or may be the same as blowers in ordinary use. The case of the blower is in open communication with the chest of the agitator, as will be seen at e, Fig. 6. The throat of the opening, however, is provided with slides d', Figs. 1 and 6, whereby the opening may be closed more or less, as circumstances may determine.

The practical operation of the above-described purifier is as follows: It may be placed in the mill at any convenient point. The middlings to be purified are conducted into the purifier through the openings i, Fig. 3, which carries the middlings into the bolt F by means of a chute arranged substantially in the same way, or may be, as the chute in ordinary use for this purpose; hence, the chute or conductor is not shown, it not being essential to the full understanding of the invention, and forming no part thereof, it being an old device; nor is, as aforesaid, the bolt covered with grades of bolting-cloth. This feature is old and in common use. As the ground middlings sift through the bolt F they fall therefrom into the agitator A, in which it is lifted up by the reel to the upper part of the chest, and dropped therefrom in light showers, through which a cross-current of air is caused to flow continually by the blowers or fans, which, by their action, produce a current of air from the chest outwardly through the outlets m of the blowers, which, as a consequence, carries with it the specks and lighter material, the waste of the middlings while being stirred up in the chest by the revolutions of the agitating-reel.

The amount of air thus discharged from the agitator may be regulated by the slides d', and which may be graduated according to the condition of the middlings, as they are passed along down the chest by the flights of the reel, to be discharged therefrom into the conductor I, through one of the series of escapes or grade openings in the bottom of the chest, provided with slides d', above referred to, while the bran passes out through an opening at the lower end.

The eduction force of the draft of the blower should be lighter near the end of the chest, into which the middlings are admitted, than at points farther along down, for the reason that the bolting-cloth covering the upper end of the bolt is a little finer than the cloths covering the bolt at points farther along down; hence, the lighter and coarser specks, &c., will be present at the upper end of the agitator, and will, therefore, require less draft to draw them out than farther along down where the cloths are coarser, and therefore coarser and heavier specks, offal, &c., are lifted through into the agitator, to remove which require a stronger draft.

By means of the slides, which are long and wide, the degree of draft can be very nicely gaged, according to the fineness of the sifting, by simply pulling out one end of the slides more or less, as indicated by the dotted lines $h$, Fig. 3, which, as will be obvious, will allow more air to pass at the end of the slides drawn out than at the end not thus drawn out, or but partially so. By this means the force of the draft of air can be regularly graduated from the upper to the lower end of the chest, thereby bringing the current of the air in a graduated manner to act upon the agitated middlings in the chest, which, by the rotation of the agitating-reel carries the middlings from the bottom of the chest to the top, and letting it fall in light showers to the bottom again, thereby exposing it very thoroughly to the outward cross-current of air, taking with it all the specks, &c., leaving the middlings clean and white.

It will be seen that some of the bars E are perforated with small holes. The purpose of these perforations is to assist in separating the middlings into fine showers while being stirred up by the reel, thereby exposing them more fully to the action of the cross-currents of air for removing the specks, &c., while the purified middlings escape from the conductor I through an outlet in its lower end.

What I claim as my invention, and desire to secure by Letters Patent, is—

The agitating-reel herein described, consisting of the shaft C, centers D, plain or perforated bars E secured thereto, and provided with flights $d$, in combination with the chest A and arranged in relation to the bolting-reel F and carrier H, to co-operate therewith, substantially as described, and for the purpose specified.

ALBERT P. TEACHOUT.

Witnesses:
J. H. BURRIDGE,
A. F. CORNELL.